United States Patent
Kishi

(10) Patent No.: US 6,961,222 B2
(45) Date of Patent: Nov. 1, 2005

(54) FLUX GUIDE TYPE DEVICE, HEAD HAVING THE SAME, AND DRIVE

(75) Inventor: Hitoshi Kishi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 166 days.

(21) Appl. No.: 10/283,650

(22) Filed: Oct. 30, 2002

(65) Prior Publication Data

US 2003/0151857 A1 Aug. 14, 2003

(30) Foreign Application Priority Data

Feb. 12, 2002 (JP) .............................. 2002-034578

(51) Int. Cl.⁷ .............................................. G11B 5/39
(52) U.S. Cl. ..................................................... 360/321
(58) Field of Search .................. 360/321, 324.12, 360/313, 110

(56) References Cited

U.S. PATENT DOCUMENTS

| | | | |
|---|---|---|---|
| 5,898,547 A * | 4/1999 | Fontana et al. | 360/324.2 |
| 6,201,673 B1 * | 3/2001 | Rottmayer et al. | 360/324.12 |
| 6,519,121 B1 * | 2/2003 | Gill | 360/324.11 |
| 6,597,546 B2 * | 7/2003 | Gill | 360/321 |
| 6,636,391 B2 * | 10/2003 | Watanabe et al. | 360/321 |
| 2002/0135949 A1 * | 9/2002 | Gill | 360/324.2 |

* cited by examiner

Primary Examiner—Julie Anne Watko
(74) Attorney, Agent, or Firm—Greer, Burns & Crain, Ltd.

(57) ABSTRACT

A flux guide type includes a magnetoresistive device for reading a signal flux, and a flux guide for transmitting the signal flux to the magnetoresistive device. The flux guide includes a laminated film that includes a ferromagnetic layer, a non-magnetic layer and a ferromagnetic layer in this order, and the two ferromagnetic layers in the flux guide have antiparallel directions of magnetization with respect to the non-magnetic layer.

16 Claims, 10 Drawing Sheets

FLUX GUIDE TYPE DEVICE, HEAD HAVING THE SAME, AND DRIVE

BACKGROUND OF THE INVENTION

The present invention relates generally to reproducing of a record carrier using magnetic means, and more particularly to a magnetoresistive device. The present invention is suitable, for example, for a read head, a magnetic sensor, a magnetic switch, etc. for use with a hard disc drive (referred to as "HDD" hereinafter).

Available electronic information content has been explosively increasing with the recent rapid technology development, as in the Internet. Accordingly, smaller and larger-capacity magnetic recorders, typified by HDDs, have been increasingly demanded to store such a large amount of information. A surface recording density indicative of recordable information content per unit recording area is required to be higher to realize a smaller and larger-capacity HDD.

The increased surface recording density accordingly reduces an area on a record carrier corresponding to one bit as a minimum unit of magnetic record data, and a signal magnetic field from the record carrier becomes weaker as a matter of course. A small and highly sensitive read head is required to faithfully read such a weak signal magnetic field with certainty.

It is expected that the surface recording density of 100 Gbit/inch$^2$ would generally requires a recordable track width of about 0.1 μm on the carrier. Currently available read heads having a spin-valve device use a so-called Current in Plane (referred to as "CIP" hereinafter) configuration that applies the sense current parallel to laminated surfaces in the spin-valve device. With higher surface recording density, a read head size should be reduced according to a reduced bit size. This is because a read head excessively large for a record bit size would simultaneously take in magnetic information from both a target record track and track(s) adjacent to the target record track, deteriorating resolution in a direction of track's width. Reading of magnetic information on a track that has been recorded with the surface recording density of the 100 Gbit/in$^2$ would require a read core width with a size of 0.1 μm or less, and this very precise process accuracy is one cause that hinders an implementation of the read head.

A tunneling magnetoresistive head ("TMR head" hereinafter), which has currently been developed as a high output head flows the sense current in a direction perpendicular to the core width, and thus the resistance value increases in reverse proportion to the core width. Since an available current value becomes small in the TMR head with a large resistance value, a read electric signal easily contains noises and makes difficult the implementation of the highly sensitive TMR head.

A flux guide type read head has been proposed as one solution for these problems. The flux guide type read head structurally forms such a flux guide between a reading surface and a device, such as a spin-valve device and a TMR device, that the flux guide facilitate reading by taking the magnetic flux from the carrier and transmitting it to the device, for example, a free layer in the spin valve. As the flux guide structure defines a core width as a flux guide's width and the core width does not depend upon the size of the device, the flux guide structure may advantageously maintain a larger device size relative to the track width and mitigate the process accuracy required for the device.

The conventional flux guide requires a thickness of at least about 20 Å in order to change a direction of magnetization of the device and to maintain the uniform magnetic property for the entire magnetic film. Therefore, the demagnetizing field that increases in proportion to the thickness at a film end face prevents the flux reversal in the flux guide. As a result, this disadvantageously drastically decreases the magnetic flux transmitted to the device, such as a free layer in the spin valve device, and lowers the sensitivity of the head. There is another problem in that the magnetic field in proportion to the thickness is formed around the flux guide and deforms the adjacent device, such as the free layer in the spin valve.

BRIEF SUMMARY OF THE INVENTION

Accordingly, it is an exemplified object of the present invention to provide a relatively easily processable flux guide type device that may read the external magnetic field that has been recorded with high density and provide a stable operation, a head having the same, and a drive.

In order to achieve the above object, a flux guide type device of one aspect of the present invention includes a magnetoresistive device for reading a signal flux, and a flux guide for transmitting the signal flux to the magnetoresistive device, wherein the flux guide includes a laminated film that includes a ferromagnetic layer, a non-magnetic layer and a ferromagnetic layer in this order, and the two ferromagnetic layers in the flux guide have antiparallel directions of magnetization with respect to the non-magnetic layer. According to this flux guide type device, the flux guide transmits the signal flux to the magnetoresistive device, enabling the device width to be larger than the core width of the flux guide and improving the sensitivity of the magnetoresistive device. The flux guide may decrease the magnetization as well as maintaining the desired layer thickness through the laminated film. Therefore, the flux guide may decrease the demagnetizing field and transmit the signal flux to the magnetoresistive device without decreasing the signal flux, increasing the reading sensitivity of the magnetoresistive device. The magnetic field generated by the flux guide may be made small enough to prevent deformation of the magnetoresistive device. A method for manufacturing the flux guide type device, a read head having the flux guide type device, a drive having the head, and other magnetic apparatus including a magnetic sensor, magnetic switch, an encoder having the flux guide type device exhibit similar operations and constitute one aspect of the present invention.

At least one of the ferromagnetic layers in the flux guide may be selected from among $Co_{90}Fe$, $(Co_{90}Fe)_{98}B_2$ and $Ni_{80}Fe$. When $Co_{90}Fe$ or $(Co_{90}Fe)_{98}B_2$ is selected, a difference in thickness in a layer direction between the ferromagnetic layers is, for example, 1 nm or less. When $Ni_{80}Fe$ is selected, a difference in thickness in a layer direction between the ferromagnetic layers is, for example, 1.5 nm or less. The two ferromagnetic layers in the flux guide have different thicknesses in a layer direction. A thinner one of the ferromagnetic layers may have a layer thickness of about 1.5 nm to 3 nm while a thicker one of the ferromagnetic layers may have a layer thickness of that of the thinner one plus about 0.5 nm to 1 nm. Such control over the layer thickness contributes to the miniaturization of the device.

The magnetoresistive device may be formed on the flux guide. The magnetoresistive device may be a layered member that includes a first ferromagnetic layer with a substantially fixed direction of magnetization, and a second ferromagnetic layer with a freely variable direction of magnetization to an external magnetic field, wherein the flux guide may serve as the second ferromagnetic layer. This structure facilitates the miniaturization and manufacture of the device, and decreases the attenuation of the signal flux that the flux guide transmits.

In order to maintain the transmission of the signal flux with less attenuation from the flux guide to the magnetoresistive device, the magnetoresistive device may be a layered member that includes a first ferromagnetic layer with a substantially fixed direction of magnetization, and a second ferromagnetic layer with a freely variable direction of magnetization to an external magnetic field, wherein the magnetization of the second ferromagnetic layer may be smaller than that of the flux guide, if necessary, down to zero.

The magnetoresistive device may be a layered member that includes a first ferromagnetic layer with a substantially fixed direction of magnetization, and a second ferromagnetic layer with a freely variable direction of magnetization to an external magnetic field, wherein the first ferromagnetic layer may include a ferromagnetic layer, a non-magnetic layer and a ferromagnetic layer in this order, and the two ferromagnetic layers in the first ferromagnetic layer have antiparallel directions of magnetization with respect to the non-magnetic layer. This configuration may reduce the magnetic field generated from the first ferromagnetic layer in the magnetoresistive device, and effectively maintain the linearization of the magnetoresistive detection (or symmetry of the signal).

The magnetoresistive device is a layered member that may include a first ferromagnetic layer with a substantially fixed direction of magnetization, and a second ferromagnetic layer with a freely variable direction of magnetization to an external magnetic field, wherein the second ferromagnetic layer includes a ferromagnetic layer, a non-magnetic layer and a ferromagnetic layer in this order, and the two ferromagnetic layers in the second ferromagnetic layer have antiparallel directions of magnetization with respect to the non-magnetic layer. The second ferromagnetic layer having a structure similar to the flux guide reduces the magnetization and improves the sensitivity.

The layered member may have a non-magnetic intermediate layer for separating the first and second ferromagnetic layers from each other, forming a GMR device, or the layered member may have an insulating player for separating the first and second ferromagnetic layers from each other, forming a TMR device.

Preferably, the second ferromagnetic layer is set to have a thickness of 1.5 nm or less so as to miniaturize the device. At least one of the two ferromagnetic layers in the second ferromagnetic layer may be selected from among $Co_{90}Fe$, $(Co_{90}Fe)_{98}B_2$ and $Ni_{80}Fe$. When $Co_{90}Fe$ or $(Co_{90}Fe)_{98}B_2$ is selected, a difference in thickness in a layer direction between the ferromagnetic layers is, for example, 1 nm or less. When $Ni_{80}Fe$ is selected, a difference in thickness in a layer direction between the ferromagnetic layers is, for example, 1.5 nm or less. The two ferromagnetic layers in the second ferromagnetic layer have different thicknesses in a layer direction. A thinner one of the ferromagnetic layers may have a thickness of about 1.5 nm to 3 nm while a thicker one of the ferromagnetic layers has a thickness of that of the thinner one plus about 0.5 nm to 1 nm. Such control over the layer thickness contributes to the miniaturization of the device.

The two ferromagnetic layers in each of the flux guide and the second ferromagnetic layer may have different thicknesses in a layer direction, and a difference in layer thickness between the two ferromagnetic layers in the flux guide may be greater than that between the two ferromagnetic layers in the second ferromagnetic layer. This structure may decrease the attenuation of the signal flux from the flux guide to the second ferromagnetic layer.

A flux guide type device of another aspect of the present invention includes a magnetoresistive device for reading a signal flux, the magnetoresistive device including a first ferromagnetic layer with a substantially fixed direction of magnetization, and a second ferromagnetic layer with a freely variable direction of magnetization to an external magnetic field, and a flux guide for transmitting the signal flux to the magnetoresistive device, the flux guide including the second ferromagnetic layer. A flux guide type device of still another aspect of the present invention includes a magnetoresistive device for reading a signal flux, and a flux guide for transmitting the signal flux to the magnetoresistive device, wherein the magnetoresistive device is layered on the flux guide. These flux guide type devices may reduce the attenuation of the signal magnetization transmitted from the flux guide to the magnetoresistive device and effectively miniaturize the device, since the flux guide contacts the magnetoresistive device.

Other objects and further features of the present invention will become readily apparent from the following description of the embodiments with reference to accompanying drawings.

DETAILED DESCRIPTION OF THE INVENTION

Figure 1:
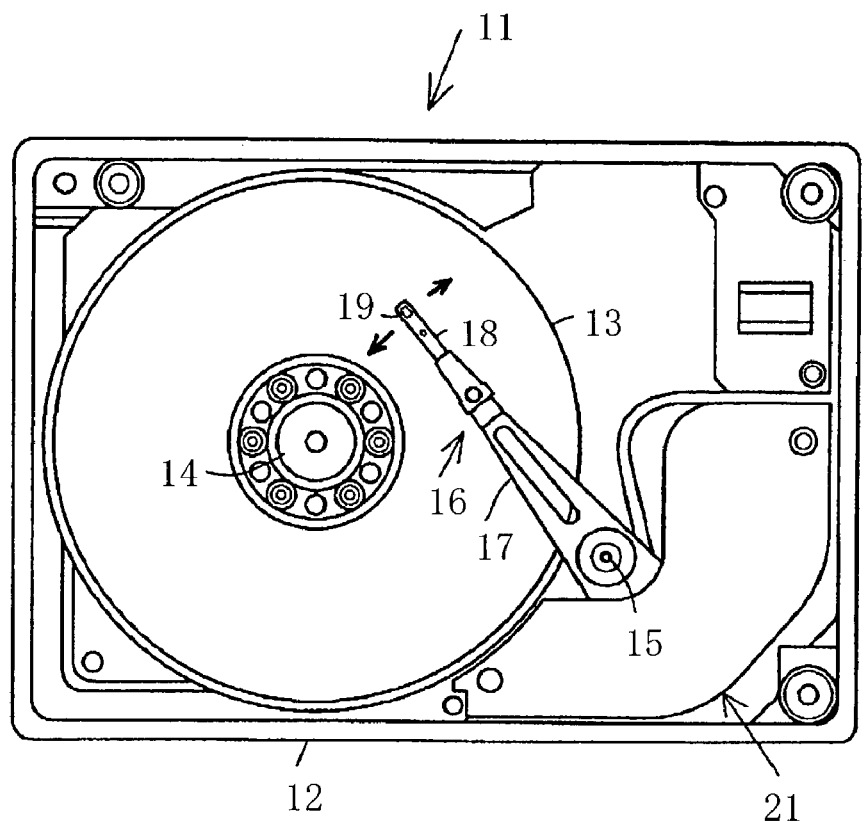
FIG. 1 is a plane view showing an internal structure of a hard disc drive as one example of the present invention.

Referring now to accompanying drawings, a description will be given of HDD 11 as one embodiment according to the present invention. The HDD 11 includes, in a housing 12 as shown in FIG. 1, one or more magnetic disc(s) 13, a spindle motor 14, and a magnetic head part. FIG. 1 is a plane view showing an internal structure of the HDD 11.

The housing 12 is made, for example, of aluminum die casting or stainless, and has a rectangular parallelepiped shape to which a cover (not shown) is coupled so as to seal its internal space. Each magnetic disc 13 in this embodiment has high recording density, such as 100 Gb/in$^2$ or higher, and is mounted on a spindle of the spindle motor 14.

The spindle motor 14 rotates the magnetic disc 13 at a high speed, such as 7200 rpm and 10,000 rpm, and includes a brushless DC motor and a spindle as its rotor part. For example, when two magnetic discs 13 are used, a disc, a spacer, a disc, and a clamp are stacked in this order on the spindle, and fixed by a bolt engaged with the spindle. Unlike this embodiment, the magnetic disc 13 may be a disc having a hub without a center hole, and the spindle rotates the disc through the hub.

The magnetic head part includes a slider 19, and an actuator 21 that serves as a mechanism for positioning and driving the slider 19.

Figure 2:
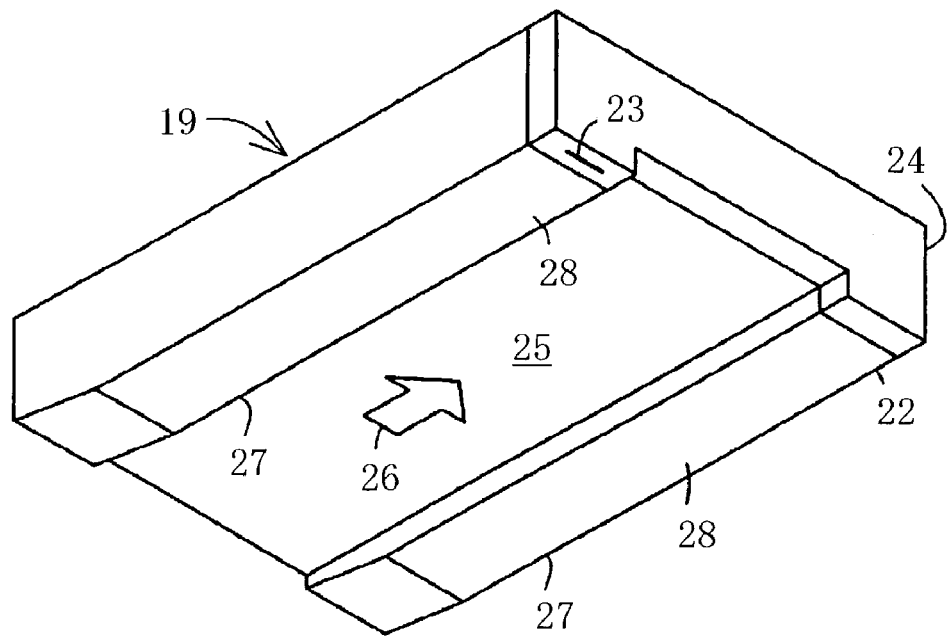
FIG. 2 is an enlarged perspective view of a slider of the hard disc drive shown in FIG. 1.

The slider 19 includes, as shown in FIG. 2, a slider body 22 having an approximately rectangular parallelepiped shape made of $Al_2O_3$—TiC ("altic"), and a head-device built-in film 24 united with at an air outflow end of the slider body 22 and made of $Al_2O_3$ ("alumina"), the film 24 including a built-in read/write head 23. Here, FIG. 2 is an enlarged perspective view of the slider 19. The slider body 22 and head-device built-in film 24 define a floatation surface 25 as a surface opposite to a carrier, i.e., the magnetic disc 13, for catching air current 26 generated from the rotating magnetic disc 13.

A pair of rails 27 are formed on the floatation surface 25, extending from an air inflow end to the air outflow end. A so-called air-bearing surface (referred to as "ABS" hereinafter) 28 is defined at a top surface of each rail 27. The buoyancy is generated at the ABS 28 according to an act of the air current 26. The head 23 embedded in the head-device built-in film 24 exposes at the ABS 28. The floatation system of the slider 19 is not limited to this form, but may use a known dynamic pressure lubricating system, a known static pressure lubricating system, a known piezoelectric control system, and any other known floatation system. Unlike the instant embodiment which uses a contact start stop system in which the slider 19 contacts the disc 13 at the time of stop, the slider 19 may be lifted up over the disc 13 before the disc 13 stops, held at a holding part (sometimes referred to as a ramp) located outside the disc 13 so as to hold the slider 19 in a non-contact manner with the disc 13, and dropped from the holding part over the disc 13 when the disc 13 is run, as in the dynamic or ramp loading system.

Figure 3:
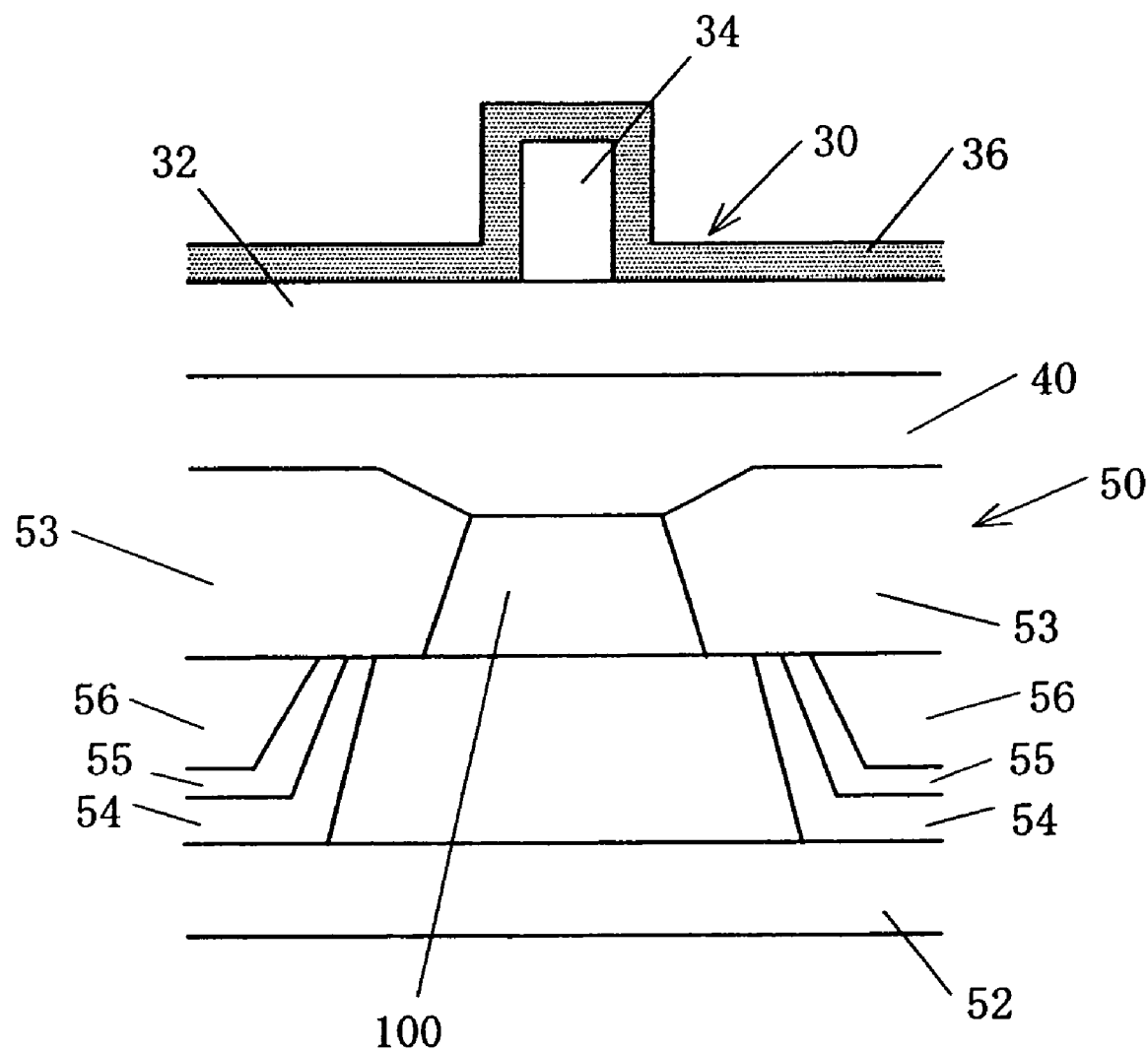
FIG. 3 is an enlarged sectional view showing a laminated structure of a head mounted onto the slider shown in FIG. 2.

A detailed description will be given of details of the floatation surface 25 with reference to FIG. 3. Here, FIG. 3 is a sectional view showing details of the floatation surface 25. The head 23 includes a magnetoresistive/inductive composite head including an inductive head device 30 for writing binary information into the magnetic disc 13 using a magnetic field induced by a conductive coil pattern (not shown), and a magnetoresistive ("MR" hereinafter) head device 50 for reading resistance as binary information changing according to a magnetic field generated by the magnetic disc 13.

The inductive head device 30 includes a non-magnetic gap layer 32, an upper magnetic pole layer 34, an $Al_2O_3$ film 36, and an upper shield-upper electrode layer 40. As discussed later, the upper shield-upper electrode layer 40 may form part of the MR head device 50.

The non-magnetic gap layer 32 spreads on a surface of the upper shield-upper electrode layer 40, which will be described later, and is made, for example, of $Al_2O_3$. The upper magnetic pole layer 34 faces the upper shield-upper electrode layer 40 through the non-magnetic gap layer 32, and is made, for example, of NiFe. The $Al_2O_3$ film 36 covers the upper magnetic pole layer 34 on a surface of the non-magnetic gap layer 32, and forms the head-device built-in film 24. The upper magnetic pole layer 34 and upper shield-upper electrode layer 40 cooperatively form a magnetic core in the inductive write head device 30. A lower magnetic pole layer in the inductive write head device 30 serves as the upper shield-upper electrode layer 40 in the MR head device 50. As the conductive coil pattern induces a magnetic field, a magnetic-flux flow between the upper magnetic pole layer 34 and upper shield-upper electrode layer 40 leaks from the floatation surface 25 due to acts of the non-magnetic gap layer 32. The leaking magnetic-flux flow forms a signal magnetic field (or gap magnetic field).

The MR head device 50 includes the upper shield-upper electrode layer 40, a lower shield-lower electrode layer 52, insulating layers 53 and 54, a primary coat layer 55, a hard ferromagnetic layer 56, and a spin-valve film 100. The upper shield-upper electrode layer 40 and lower shield-lower electrode layer 52 are made, for example, of attic, FeN and NiFe, and supply the sense current to the spin-valve film 100. Thus, the instant embodiment applies the sense current perpendicular to a direction of lamination. Of course, the present invention does not exclude a Giant Magnetoresistive using the CIP configuration ("CIP-GMR" hereinafter) as described with reference to FIG. 12. In addition, the present invention is applicable to the TMR in addition to the GMR.

The insulating layers 53 and 54 insulate the upper shield-upper electrode layer 40 and lower shield-lower electrode layer 52, and are made, for example, of $Al_2O_3$. The hard ferromagnetic layer 56 is made, for example, of such a magnetic material as CoPt alloy and CoCrPt alloy, and applies constant bias at the time of operations of the free ferromagnetic layer 120, etc., which will be described later. The primary coat layer 55 serves to display characteristics of the hard ferromagnetic layer 56.

Figure 4:
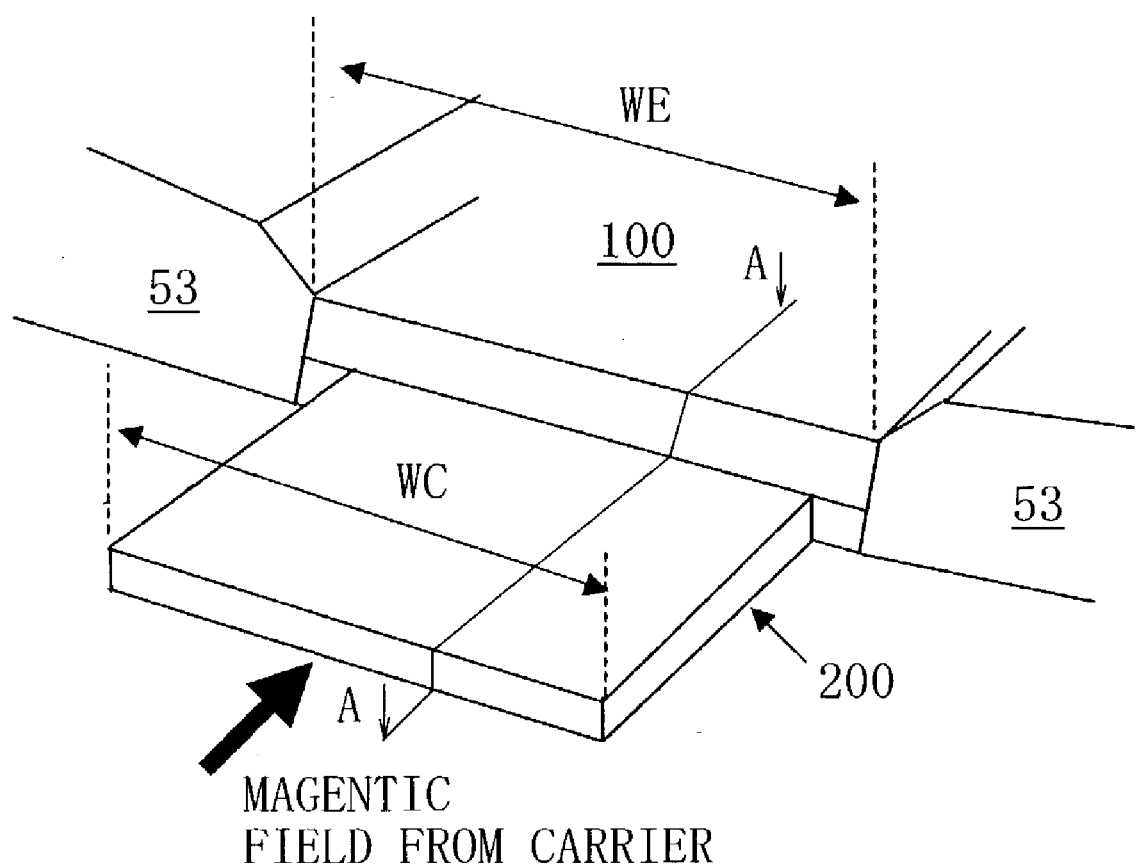
FIG. 4 is a perspective overview a flux guide type MR head device shown in FIG. 3.

The MR head device 50 of the instant embodiment has a flux guide in front of the paper of FIG. 3 and constitutes a flux guide type head. A detailed description will be given of the MR head device 50 of the instant embodiment, with reference to FIGS. 4 and 5. Here, FIG. 4 is an enlarged perspective view of essential part of the MR head device 50, and FIG. 5 is a sectional view taken along line A—A in FIG. 4.

Thus, the MR head device 50 includes a flux guide film 200 via an insulating aperture IA. The flux guide film 200 serves to take a magnetic flux from the magnetic disc 13 as a carrier towards the spin-valve film 100, making larger the device width WE of the MR head device 50 in FIG. 4 than a track width (which is about 0.1 μm) as a magnetic signal width for actually reading information on the magnetic disc 13.

Figure 5:
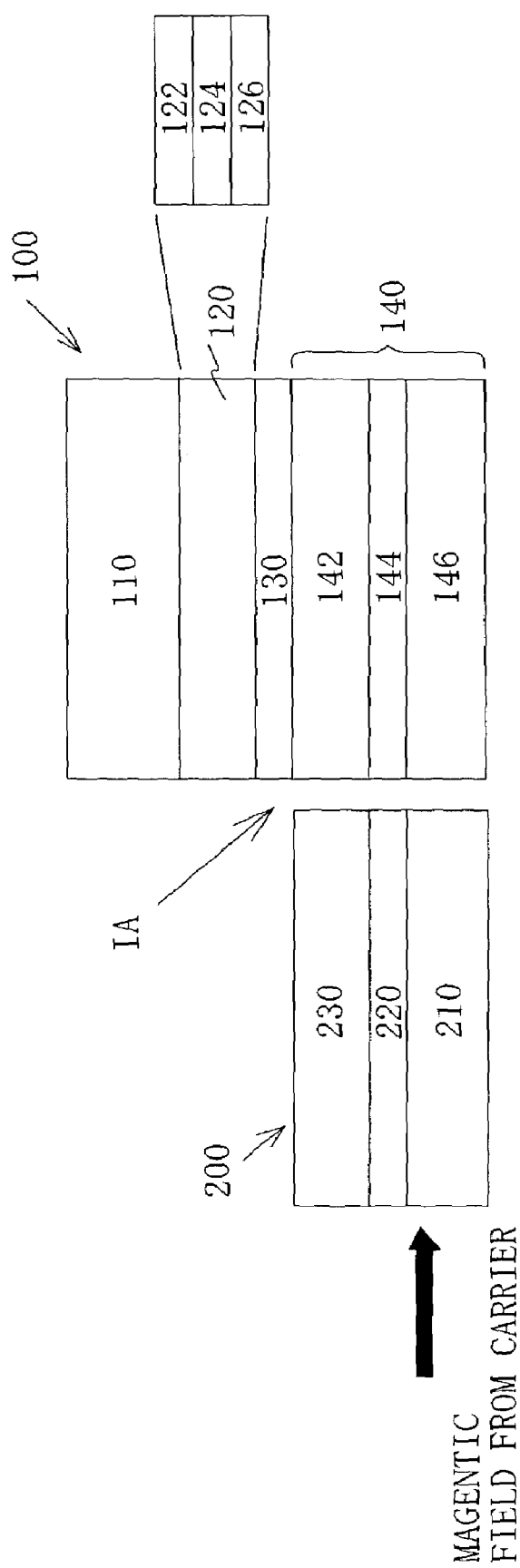
FIG. 5 is a sectional view taken along line A—A.

The flux guide film 200 of the instant embodiment includes, as shown in FIG. 5, a synthetic ferri structure. Nevertheless, according to the present invention, the flux guide film 200 may include a ferromagnetic layer, a non-magnetic layer and a ferromagnetic layer in this order, where two ferromagnetic layers may be made of the same material or different materials.

The synthetic ferri structure is a laminated film configured to hold one non-magnetic layer between two magnetic layers. Typically, the synthetic ferri structure has a laminated film including a ferromagnetic metal layer, a non-magnetic metal layer and a ferromagnetic metal layer, where these two ferromagnetic metal layers have antiparallel directions of magnetization with respect to the non-magnetic metal layer. The synthetic ferri structure is, for example, Co/Ru/Co that may include Fe, B and CO. In the instant embodiment, the flux guide film 200 includes ferromagnetic layers 210 and 230, and a non-magnetic layer 220 between them.

For instance, a synthetic ferri film that uses a Co/Ru/Co laminated structure results in ferromagnetic coupling (with parallel directions of magnetization) or antiferromagnetic coupling (with antiparallel directions of magnetization) between these Co layers according to a thickness of 5–9 Å of the Ru layer. When this nature is applied to a pinned layer 120 in the spin-valve layer 100, which will be described later, to generate an antiferromagnetic coupling state (i.e., antiparallel directions of magnetization between these two Co layers), the magnetic field generated from the pinned layer 120 may be reduced. This structure itself has been known as an SFP (Synthetic Ferri Pinned Layer), and effective to maintain linearization of the detected magnetic resistance. However, no examples have been proposed to apply the synthetic ferri structure for the flux guide 200 in a circumstance seeking for the high sensitivity as in the instant embodiment.

The flux guide film 200 of the instant embodiment has a synthetic ferri structure and provides the ferromagnetic metal layers 210 and 230 with antiparallel directions of magnetization. Since the entire magnetization of the flux guide film 200 is a difference between both layers 210 and 230, the flux guide film 200 may maintain a stable layer thickness to some extent while reducing the entire magnetization or making the magnetization zero. This may reduces a generation of the demagnetizing field and a decrease of the magnetic field transmitted to the MR head device 50, thereby enhancing the sensitivity of the head 23. As the entire magnetization is small, the flux guide film 200 acts like a bar magnet, reducing a generation of the magnetic field that would deforms the MR head device 50.

The ferromagnetic metal layers 210 and 230 each may be made, for example, of NiFe and CoFe. More specifically, NiFe is, for example, $Ni_{80}Fe$ alloy, CoFe is, for example, $Co_{90}Fe$ alloy and $(Co_{90}Fe)_{98}B_2$ alloy. The non-magnetic layer 220 is made, for example, of Ru.

It is assumed that both layers 210 and 230 are made of NiFe. The thickness of the free layer 140 in the spin-valve film 100, which will be described later, should generally be 1.5 nm for the recording density of 100 Gbit/inch$^2$ when the material having the residual flux density Br equivalent to NiFe is used in view of the magnetic field from the magnetic disc 13 as a carrier and sensitivity of the free layer 140. This value corresponds to a thickness of part that receives the magnetic field from the carrier. Since this embodiment makes the ferromagnetic metal layers 210 and 230 of the same material, the entire magnetization of the flux guide film 200 is a difference in thickness between both layers 210 and 230, and the difference should be 1.5 nm or smaller.

When the both layers 210 and 230 are made of CoFe, the residual flux density Br is 1.5 times that of NiFe and thus the thickness should be 1.5/1.5=1 nm or smaller.

It is expected that a minimum difference in thickness between the layers 210 and 230, which stabilizes the synthetic ferri layer is about 0.5 nm, and thus the difference in layer thickness of about 0.5 nm to 1 nm is proper. A thinner one should have a layer thickness of 1.5 nm or larger in the synthetic ferri film in order to maintain the continuity of the thin film and stabilize the operation of the synthetic ferri film. Therefore, as a range of the thickness of the synthetic ferri film where both layers 210 and 230 are made of CoFe, the thinner one has a thickness of about 1.5 nm to 3 nm and the thicker one has a thickness of that of the thinner one plus about 0.5 nm to 1 nm.

A description will now be given of the spin-valve film 100. The spin-valve film 100 of this embodiment is a so-called top (type) spin valve that arranges a free ferromagnetic layer at a side close to a substrate 52 to be laminated, on which a lower electrode layer is formed on the top (i.e., lower shield-lower electrode layer) 52, but the present invention is applicable to a so-called bottom (type) spin valve that arranges an exchange-coupling layer/pinned ferromagnetic layer close to the substrate to be laminated, and a so-called dual (type) spin valve that arranges a non-magnetic intermediate layer/pinned ferromagnetic layer/exchange-coupling layer above and below the free ferromagnetic layer as a center. One example of each of the bottom spin valve, and a dual spin valve will be described with reference to FIGS. 13 and 14.

The spin-valve film 100 has a laminated structure that basically includes, in this order, a free ferromagnetic layer, a non-magnetic intermediate layer, a pinned magnetic layer, and an exchange-coupling layer, forming a GMR sensor. The GMR sensor in this embodiment forms a GMR-CPP sensor as a Current Perpendicular to Plane ("CPP") sensor that applies the sense current perpendicular to laminated surfaces in the sensor film. This spin-valve film 100 has advantages in sufficiently reducing hysteresis and controlling magnetic domain.

The CPP configuration effectively draws out a scattering effect, as one of factors for causing a change in magnetic resistance, dependent upon a spin direction of a conduction electron at an interface between magnetic and non-magnetic laminated layers, and improves a rate of change in magnetic resistance about twice as high as the CIP configuration. Therefore, this configuration improves the sensitivity of the head 23. In addition, the device sectional area (device's width×device's height) through which the sense current flows is three to five times as large as CIP's sectional area (device's width×device's height). Moreover, the CIP configuration has different specific resistance for each metal layer in the laminated film and the current flows in such a layer as a Cu layer having small specific resistance. Therefore, if it is assumed that the maximum current density is the current density at part where the most current flows, the film as a whole allows the sense current of only 40% of the permissible current density. Therefore, the CPP configuration may flow the sense current 7–12 times as large as the CIP configuration. In addition, it is necessary to reduce the sense current value due to the reduced device sectional area with the higher surface recording density, but a readout output value becomes advantageously constant when a rate of change in resistance is constant since device's resistance increases in inverse proportion to the device sectional area.

The spin-valve film 100 has a sandwich structure including two uncoupled ferrormagnetic layers (i.e., pinned layer 120 and free layer 140), separated by a non-magnetic intermediate layer (or sometimes referred to as a "spacer") 130, wherein one of the ferromagnetic layers (i.e., pinned layer 120) has a fixed direction of magnetization. A fixed magnetization usually attaches an exchange-coupling layer (or sometimes referred to as a pinning layer) 110 as an antiferromagnetic metal layer, typified by Fe—Mo alloy, to the pinned layer 120. According to this structure, when an external magnetic field applies, a direction of magnetization of the free layer 140 freely rotates and accords with a direction of the external magnetic field, generating a difference in angle relative to the direction of magnetization of the pinned layer 120. The spin dependent scattering of a conduction electron varies according to the difference in angle, and thus the electric resistance value changes. A signal magnetic field from a magnetic disc 13 is obtained by detecting the changed electric resistance value.

If necessary, as shown in the right in FIG. 5, the pinned layer 120 may use the synthetic ferri structure. For example, the pinned layer 120 may include a first pinned ferromagnetic layer 122 made of CoFeB having a thickness of 4 nm, an antiferromagnetic exchange-coupling layer 124 made of Ru having a thickness of 0.8 nm, and a second pinned ferromagnetic layer 126 made of CoFeB having a thickness of 4 nm. Thus, the pinned layer provides two CoFeB layers with the antiferromagnetic coupling (with the antiparallel directions of magnetization) reduces the magnetic field generated from the pinned layer 120. This effect is effective to maintain linearization of the detected magnetic resistance (or symmetry of a signal), and particularly suitable for an environment seeking high sensitivity as in the present invention.

The free layer 140 in the spin-valve layer 100 of the instant embodiment includes, similar to the flux guide film 200, a synthetic ferri structure composed of a ferromagnetic metal layer 142, a non-magnetic layer 144 and a ferromagnetic metal layer 146. Such a structure has advantages, similar to the flux guide film 200, of stabilization of the device structure by maintaining the sufficient layer thickness and of a reduction of the magnetization. In order for the free layer 140 to effectively receive the magnetic flux transmitted through the flux guide film 200, it is preferable to make smaller the magnetization of the free layer 140 than that of the synthetic ferri film of the flux guide film 200. Here, the free layer 140 uses the synthetic ferri film and thus control over the magnetization is easy. When two ferromagnetic layers 142 and 146 in the free layer 140 and two ferromagnetic layers 210 and 230 in the flux guide film 200 are made of the same material, a difference in layer thickness between the ferromagnetic layers 210 and 230 in the flux guide film 200 is set to be larger than that between the ferromagnetic layers 142 and 146 in the free layer 140.

According to the present invention, the free layer 140 may include a ferromagnetic layer, a non-magnetic layer and a ferromagnetic layer in this order, where these two ferromagnetic layers are made of the same material or different types of materials. Since the ferromagnetic metal layers 142 and 146 correspond to the layers 210 and 230 and the non-magnetic layer 144 corresponds to the non-magnetic layer 220, a detailed description thereof will be omitted.

In order to use the spin-valve film 100 for the read head 23, the free layer 140 should have single magnetic domain in a direction perpendicular to an entry direction of the signal magnetic field for a stable magnetic field response characteristic. In other words, the free layer 140 preferably behaves as one body in the magnetic field from the carrier. As the directions of magnetization in these two ferromagnetic metal layers 142 and 146 in the free layer 140 are antiparallel, low and high resistance interferences are simultaneously formed in each spin direction. Although it appears that this would cancel out the spin dependent scattering effect and reduce a rate of change in magnetic resistance, the magnetic flux transmitted by the flux guide film 200 may supplement the lowered sensitivity.

When the spin valve film 100 is made of the CIP-GMR, the current flows in the direction of the core width WC. It is necessary to form the insulating aperture IA between the flux guide 200 and the magnetoresistive device 50, preventing the output of the device 50 from lowering as a result of that the shunt current flows through the flux guide film 200. It is also necessary to form the aperture IA as small as possible (preferably down to 10 nm or smaller) in order to prevent the lowered ouput when the magnetic information propagates as a magnetic field. Here, as the flux guide film 200 and the free layer 140 use the synthetic ferri film, it is possible to make larger the device width WE than a width of the flux guide as the core width WC. For example, the device width WE of 0.2 μm may be formed relative to the flux guide width of 0.1 μm as the core width WC.

Figure 12:
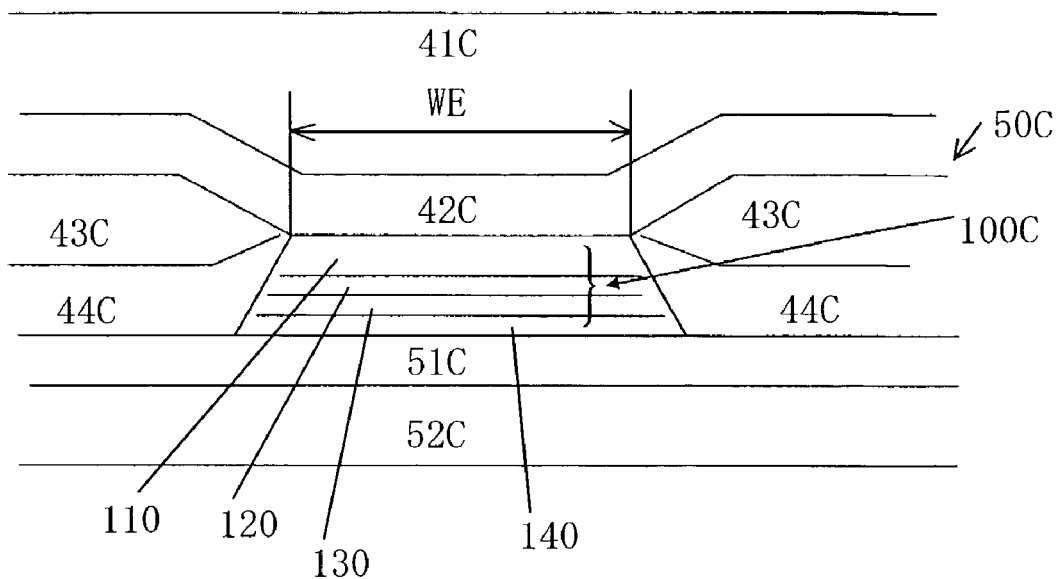
FIG. 12 is a schematic sectional view of a flux guide type MR head having a CIP structure.

Referring now to FIG. 12, a description will be given of the MR head device 50C in which the MR head device 50 has the CIP configuration. Here, FIG. 12 is a schematic sectional view showing one example of the MR head device 50C having the CIP configuration. The MR head device 50C includes an upper shield layer 41C, an upper gap (insulating) layer 42C, an electrode film 43C for applying the sense current and defining the device width WE, a hard bias film 44C for generating a bias magnetic field, a lower shield layer 52C, a lower gap (insulating) layer 51C, and a spin-valve film 100C. The spin-valve film 100C includes, as described later with reference to FIG. 5, an exchange-coupling layer 110, a pinned layer 120, a non-magnetic intermediate layer 130, and a free layer 140. Usually, a non-magnetic layer made, for example, of Ta as a primary coat layer and a protective layer is provided at a top of the exchange-coupling layer 110 and a bottom of the free layer 140.

A description will be given of a method of manufacturing the structure shown in FIG. 5, with reference to FIGS. 8A–8E. Here, FIGS. 8A–8E are sectional views showing a process flow that manufactures the structure shown in FIG. 5.

Figures 8A, 8B:
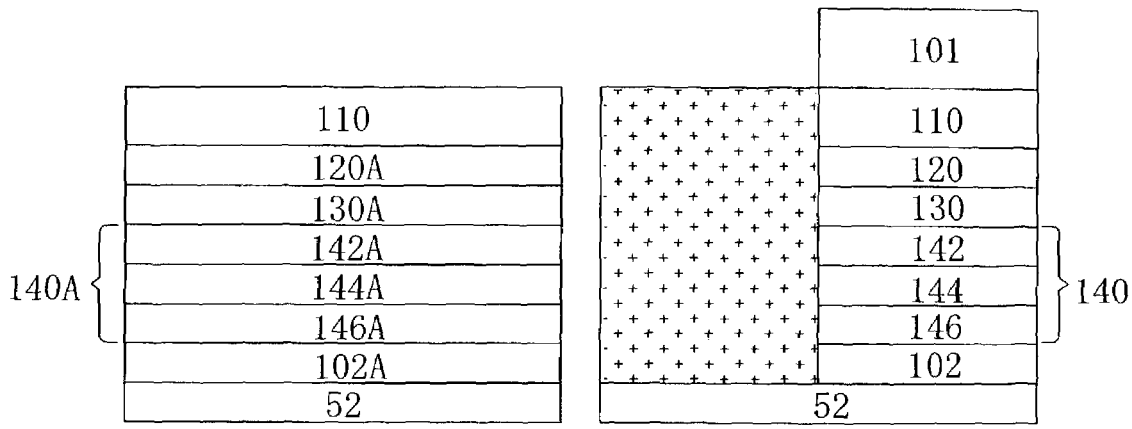
FIG. 8 is a sectional view for explaining a process flow that manufactures a structure shown in FIG. 7.

As shown in FIG. 8A, the lower electrode layer made of Cu/Au with a layer thickness of 400 nm is formed by magnetron sputtering, and patterned by usual photolithography. Then, an altic substrate 52 is formed by an ion milling device. An electrode of Cu is used from affinity with Co in the CoFe layer 146 in the free layer 140.

Then, laminated, in order from down to up, on the substrate 52 are a primary coat layer (or sometimes referred to as an "orientation control film") 102A that includes a layer made of Ta with a layer thickness of 5 nm and a layer made of NiFe with a layer thickness of 2 nm, a free layer with a thickness of 5 nm, a non-magnetic intermediate layer 130A made of Cu with a layer thickness of 4 nm, a pinned ferromagnetic layer 120A made of CoFeB with a layer thickness of 3 nm, and an exchange-coupling layer 110A made of PdPtMn with a layer thickness of 15 nm. The primary coat layer 102 uses Ta to improve NiFe crystalline and soft magnetic characteristics.

The structure shown in FIG. 5 may use the TMR film. In using the TRM film instead of the CPP-GMR, the insulating layer of $Al_2O_3$ layer is used for the non-magnetic intermediate layer 130. Similarly, the primary coat layer 102 may use Ta with a thickness of about 10 nm and NiFe with a thickness of about 3 nm. Other processes are the same as the instant steps.

Next, as shown in FIG. 8B, a resist film 101 is formed on part of the exchange-coupling layer 110A using photolithography, and the ion milling device removes part that has no resist, as shown by net lines in FIG. 8B, down to the primary coat layer 102. The part on which the resist film 101 is formed is an area in which the spin-valve film 100 is going to be formed.

Figures 8C, 8D:
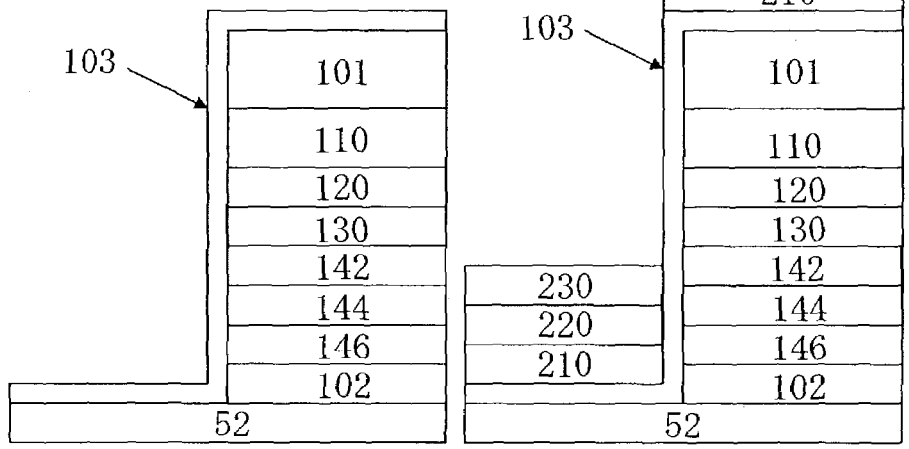

Then, as shown in FIG. 8C, the $Al_2O_3$ film 103 is formed as an insulating layer on the entire surface using the CVD method. An attachment to the wall surface becomes very small when the sputtering method is used to form the film 103, the CVD method may form the film 103 on both the wall surface and top surface with approximately the same thickness. The thickness of the insulating layer 103 determines the width of the aperture IA.

Then, as shown in FIG. 8D, the synthetic ferri structure that will constitute the flux guide film 200 is formed on the top using the sputtering method. The synthetic ferri structure is formed on the resist film 103.

Figure 8E:
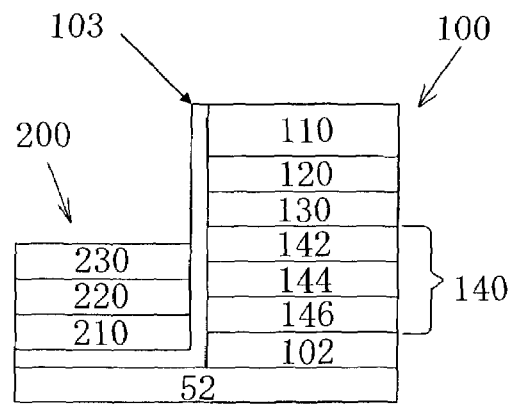

Then, as shown in FIG. 8E, the resist film 103 and the synthetic ferri film attached to the film 103 are peeled off or lifted off. As a result, the structure shown in FIG. 5 is completed. In this case, FIG. 5 omits the primary coat layer 102 and insulating layer 103. An electrode-added protective layer (not shown) that includes a layer made of Ta with a layer thickness of 5 nm, and a layer made of Au with a layer thickness of 10 nm. The protective layer uses Ta because of its congeniality to Mn, and serves as a cap layer to prevent deterioration of the laminated part.

Figure 6:
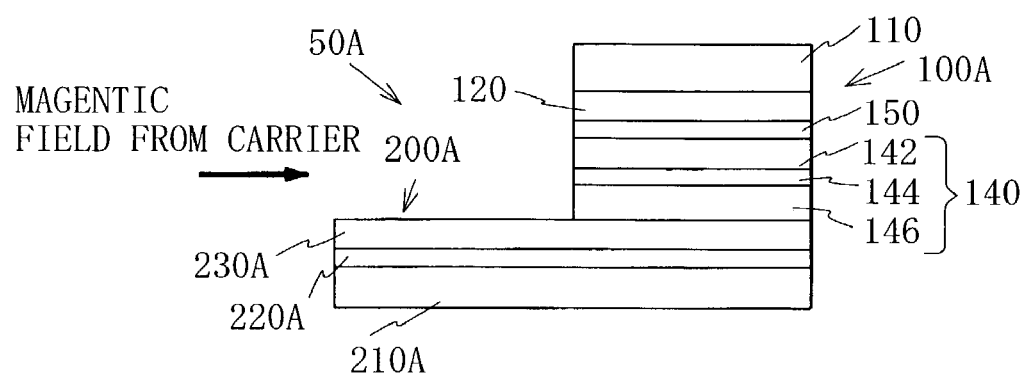
FIG. 6 is a schematic sectional view as a variation of a structure shown in FIG. 5.

Referring now to FIG. 6, a description will be given of the MR head device 50A of the second embodiment. Here, FIG. 6 is a schematic sectional view of the MR head device 50A. The structure shown in FIG. 6 uses the TMR device 100A.

The TMR device 100A has a ferromagnetic tunnel junction sandwiching the insulating layer 150 with two ferromagnetic layers 120 and 140, and uses a tunneling phenomenon in which an electron in the minus side of ferromagnetic layer passes through the insulating layer 150 and enters the plus side of ferromagnetic layer when voltage is applied between these two ferromagnetic layers 120 and 140. The insulating layer 150 may use, for example, an $Al_2O_3$ layer.

This embodiment removes the aperture IA shown in FIG. 5 and extends the flux guide film 200 to a flux guide film 200A. The TMR device 100A is formed on the flux guide film 200A. In the TMR device 100A in which the current flows perpendicular to the core width direction, the shunt current does not occur unlike the CIP-GMR and thus the flux guide film 200A may be formed so that it may directly contact the free layer 140. Therefore, the above CPP-GMR may be formed instead of the TMR device 10A. The MR device 50A of this embodiment may transmit a change of a direction of magnetization of the flux guide 200A to the free layer 140 without deteriorating the change. In addition, since the free layer 140 itself does not have to feel the magnetic field from the carrier, the two magnetic layers in the synthetic ferri film used as the free layer may have the same thickness so that the magnetization of the free layer may be substantially zero, improving the sensitivity of the head 23.

The structure shown in FIG. 6 may be obtained by forming two synthetic ferri structures on the primary coat layer 102 in FIG. 8A, etching down to a top of the lower synthetic ferri structure, and then removing the resist film 101.

Figure 7:
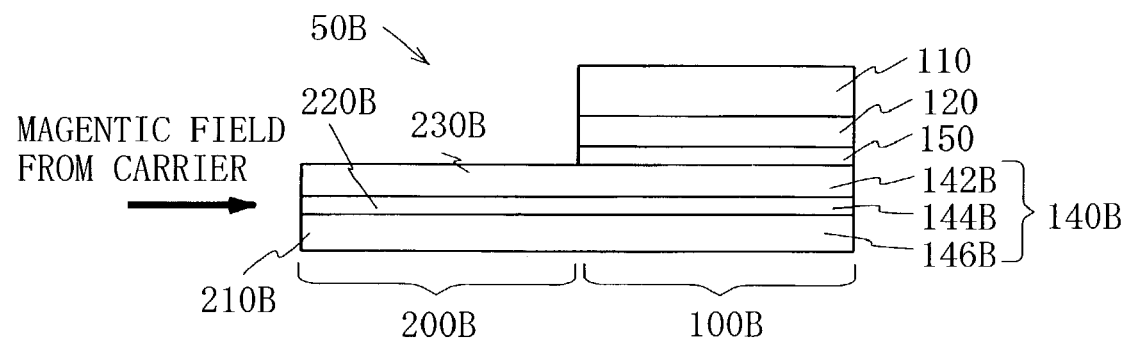
FIG. 7 is a schematic sectional view as another variation of a structure shown in FIG. 5.

Referring now to FIG. 7, a description will be given of the MR head device 50B of the third embodiment. Here, FIG. 7 is a schematic sectional view of the MR head device 50B. The structure shown in FIG. 7 uses the TMR device 100B and the flux guide 200B which share the synthetic ferri structure 140B and allow the synthetic structure 140B to partially project like a convex shape so as to form the TMR device 100B and the flux guide 200B using the same film. In other words, in FIG. 7, the layers 142B and 230B are made of the same layer, the layers 146B and 210B are made of the same layer, and the layers 144B and 220B are made of the same layer.

In this MR head device 50B, the flux guide film 200B and the free layer 140B are made of the same films, a magnetic signal that the flux guide film 200B has picked up is used to magnetically rotate the free layer 140B without deterioration.

Figures 9A, 9B:
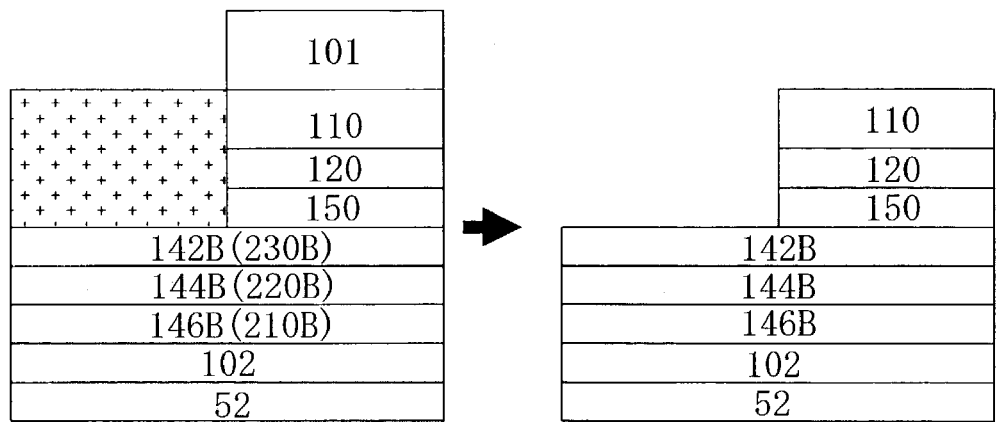
FIG. 9 is a sectional view for explaining a process flow that manufactures a structure shown in FIG. 5.

The structure shown in FIG. 7 may be obtained by a process flow shown in FIGS. 9A–9B. Here, FIGS. 9A–9B are sectional views of the process flow for obtaining the structure shown in FIG. 7. The structure shown in FIG. 8A is formed as shown in FIG. 9A, and the structure down to the insulating layer 150 is removed by etching as shown in the net lines in FIG. 8B, instead of etching down to the primary layer 102. Thereafter, the structure shown in FIG. 7 is obtained by removing the resist film 101, as shown in FIG. 9B. In comparison with the above two methods, this method is very easy to execute. Incidentally, FIG. 7 omits the lower shield-lower electrode layer 52 and primary coat layer 102 shown in FIG. 9B.

Figure 13:
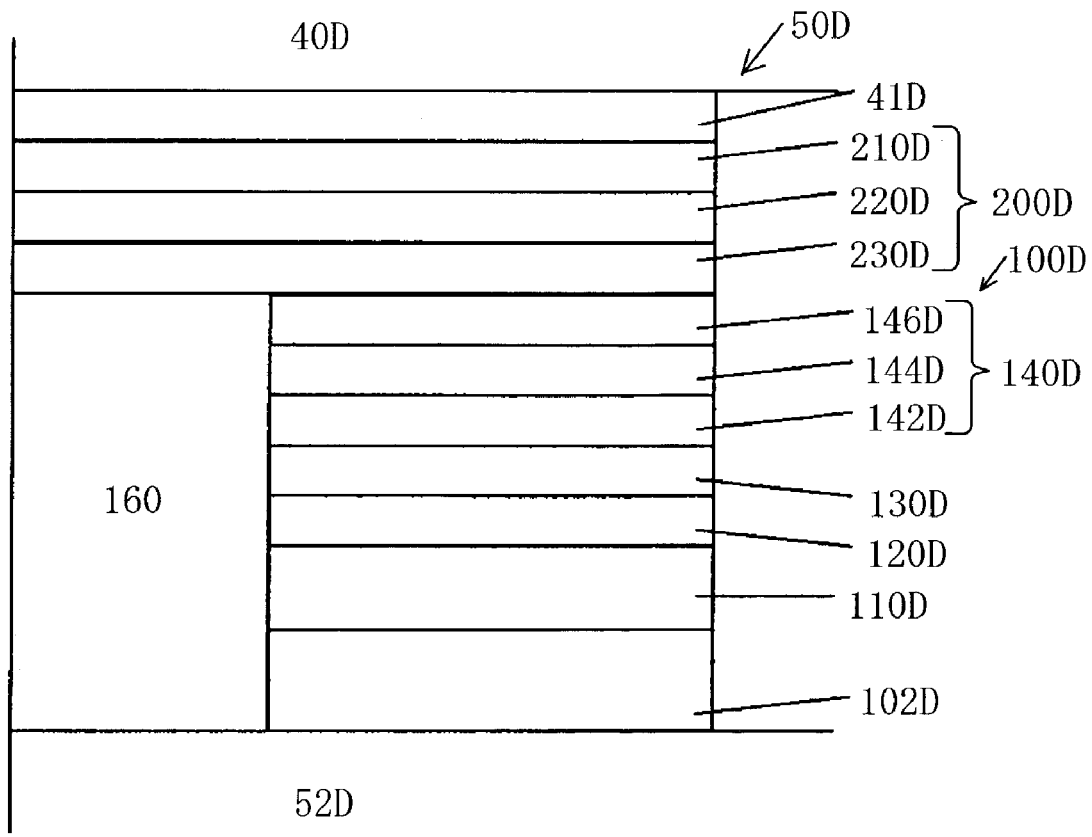
FIG. 13 is a schematic sectional view of a flux guide type MR head device of a down CPP structure corresponding to FIG. 6.

Referring now to FIG. 13, a description will be given of the MR head device 50D having the bottom (type) spin valve 100 corresponding to the structure shown in FIG. 6. Here, FIG. 13 is a schematic sectional view of the MR head device 50D. The MR head device 50D includes an upper shield-electrode layer 40D made of NiFe with a thickness of 3 $\mu$m, an upper electrode layer 41D made of Cu with a thickness of 5 nm, a flux guide 200D, an insulating layer 160 made of $Al_2O_3$ with a thickness of 33.3 nm, a bottom spin valve 100D, a primary coat layer 102D that includes a layer made of Ta with a thickness of 5 nm and a layer made of NiFe with a thickness of 3 nm, and a lower shield-lower electrode layer 52D made of NiFe with a thickness of 3 $\mu$m.

The flux guide 200D includes a magnetic layer 210D made of CoFe with a thickness of 3 nm, an intermediate layer 220D made of Ru with a thickness of 8 nm, and a magnetic layer 230D made of CoFe with a thickness of 2 nm. The upper electrode 41D magnetically isolates the upper shield-electrode layer 40D from the magnetic layer 210D in the flux guide 200D.

The bottom spin valve 100 includes an exchange-coupling layer 110D made of PdPtMn with a thickness of 15 nm, a pinned ferromagnetic layer 120D made of CoFe with a layer thickness of 2.5 nm, an intermediate layer 130D made of Cu with a thickness of 2.5 nm, and a free layer 140D (that includes a free magnetic layer 142D made of CoFe with a thickness of 2 nm, a free intermediate layer 144D made of Cu with a thickness of 0.8 nm, and a free magnetic layer 146D made of CoFe with a thickness of 2.5 nm).

In the process flow, the primary coat layer 1-2D to the free magnetic layer 146D are formed on the lower shield-electrode layer 52D using sputtering. Then, the photolithography is used to form resist (not shown) on the spindle-valve film 100D except part on which the insulating layer 160 is going to be formed, and the ion milling device is used to etch that. Then, the insulating layer 160 is formed on the etched part as shown in FIG. 13, using the lift-off method. Then, the flux guide layer 20D and upper electrode layer 41D are formed, as shown in FIG. 13, on the etched spin valve film 100D and the insulating layer 160.

Figure 14:
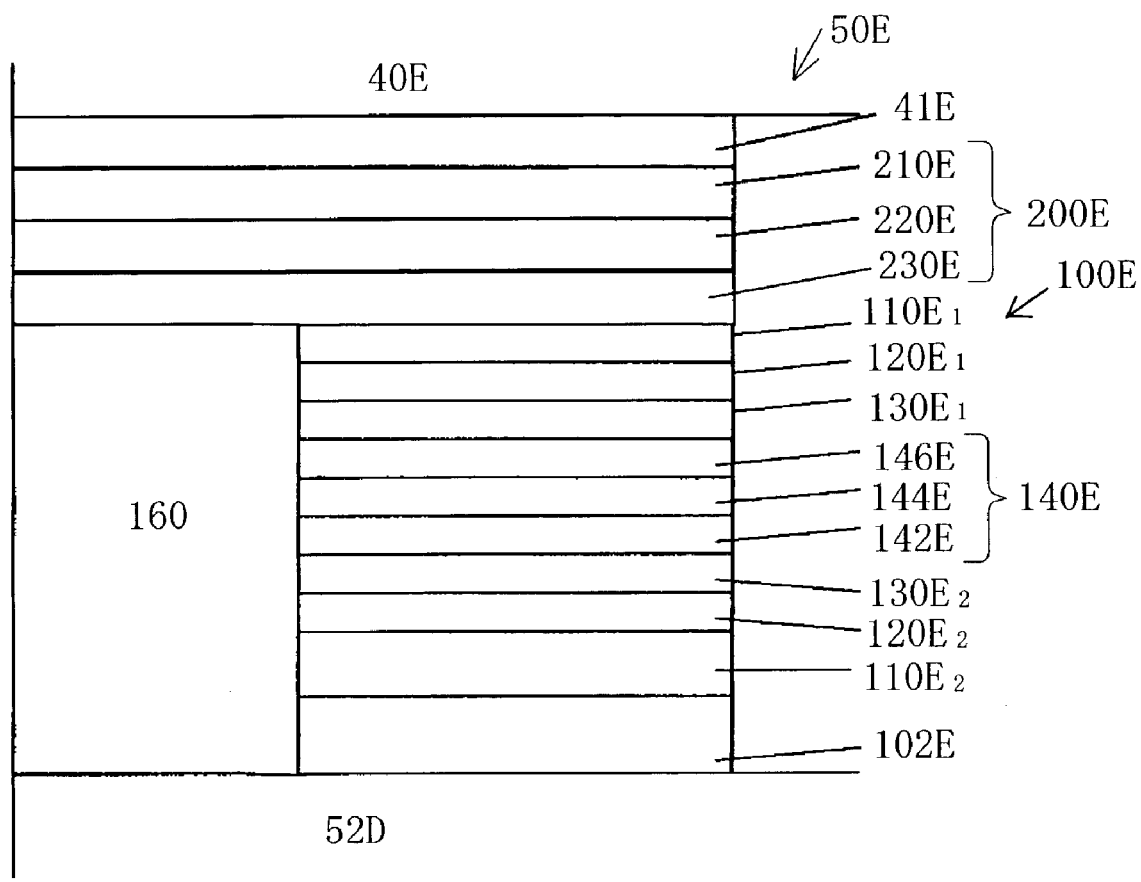
FIG. 14 is a schematic sectional view of a flux guide type MR head device of a dual CPP structure corresponding to FIG. 6.

Referring now to FIG. 14, a description will be given of the MR head device SOE having the dual (type) spin valve 100E corresponding to the structure shown in FIG. 6. Here, FIG. 14 is a schematic sectional view of the MR head device 50E. The MR head device 50E includes an upper shield-electrode layer 40E made of NiFe with a thickness of 3 $\mu$m, an upper electrode layer 41E made of Cu with a thickness of 5 nm, a flux guide 200E, the insulating layer 160 made of $Al_2O_3$ with a thickness of 33.3 nm, a dual spin valve 100E, a primary coat layer 102E that includes a layer made of Ta with a thickness of 5 nm and a layer made of NiFe with a thickness of 3 nm, and a lower shield-lower electrode layer 52E made of NiFe with a thickness of 3 µm. The upper shield-electrode layer 40E, the upper electrode layer 41E made of Cu with a thickness of 5 nm, and the flux guide 200E are the same as the upper shield-electrode layer 40D, the upper electrode layer 40D made of Cu with a thickness of 5 nm, and the flux guide 200D.

The dual spin-valve 100E includes exchange-coupling layers $110E_1$ and $E_2$ each made of PdPtMn with a layer thickness of 15 nm, pinned layers $120E_1$ and $E_2$ each made of CoFe with a layer thickness of 2.5 nm, intermediate layers $130E_1$ and $E_2$ made of Cu with a thickness of 2.5 nm, and a free layer 140E (that includes a free magnetic layer 142E made of CoFe with a thickness of 2 nm, a free intermediate layer 144E made of Cu with a thickness of 0.8 nm, and a free magnetic layer 146E made of CoFe with a thickness of 2.5 nm). The process flow is the same as that shown in FIG. 13, and a description thereof will be omitted.

EXAMPLE 1

The structure shown in FIG. 6 is produced. The flux guide film 200 includes a magnetic layer 210 made of CoFe with a thickness of 30 Å, an intermediate layer 220 made of Ru with a thickness of 8 Å, and a magnetic layer 230 made of CoFe with a thickness of 20 Å. At the opposite side to the carrier with respect to the flux guide film 200, the spin-valve film 100 is formed which includes a free magnetic layer 146 made of CoFe with a thickness of 25 Å, a free intermediate layer 144 made of Ru with a thickness of 8 Å, a free magnetic layer 142 made of CoFe with a thickness of 20 Å, a spin-valve intermediate layer 130 made of Cu with a thickness of 25 Å, a pinned magnetic layer 120 made of CoFe with a thickness of 25 Å, and an antiferromagnetic layer 110 made of PdPtMn with a thickness of 150 Å.

Following a formation of each film, a thermal treatment was conducted to order the PdPtMn exchange-coupling layer, in a vacuum magnetic field at 280° C. for three hours under magnetic-field application of 2 tesla.

A device was processed at a size of 0.3×0.3 µm to 1×1 µm using the usual photolithograly and ion milling method. Then, an $Al_2O_3$ insulating layer 53 with a layer thickness of about 70 nm was formed using magnetron sputtering in part other than the device, and then a Cu upper electrode layer with a layer thickness of 300 nm was formed, whereby the upper shield-upper electrode layer 40 is formed.

EXAMPLE 2

The structure shown in FIG. 6 is produced. The flux guide film 200A includes a magnetic layer 210A made of CoFe with a thickness of 25 Å, an intermediate layer 220A made of Ru with a thickness of 8 Å, and a magnetic layer 230A made of CoFe with a thickness of 20 Å. The TMR film 100A is formed on the flux guide film 200A which includes a free magnetic layer 146 made of CoFe with a thickness of 25 Å, a free intermediate layer 144 made of Ru with a thickness of 8 Å, a free magnetic layer 142 made of CoFe with a thickness of 25 Å, a TMR intermediate layer 150 made of $Al_2O_3$ with a thickness of 8 Å, a pinned magnetic layer 120 made of CoFe with a thickness of 25 Å, and an antiferromagnetic layer 110 made of PdPtMn with a thickness of 150 Å.

EXAMPLE 3

The structure shown in FIG. 7 is produced. The TMR film 100B is formed which includes a free magnetic layer 146B made of CoFe with a thickness of 23 Å, a free intermediate layer 144B made of Ru with a thickness of 8 Å, a free magnetic layer 142B made of CoFe with a thickness of 25 Å, a TMR intermediate layer 150 made of $Al_2O_3$ with a thickness of 8 Å, a pinned magnetic layer 120 made of CoFe with a thickness of 25 Å, and an antiferromagnetic layer 110 made of PdPtMn with a thickness of 150 Å. The process then applies resist onto part which will become the TMR device 100B, and removes through etching a portion from the top to the $Al_2O_3$ film, thereby projecting the free layer 140B and activating the flux guide film 200B.

Figure 10:
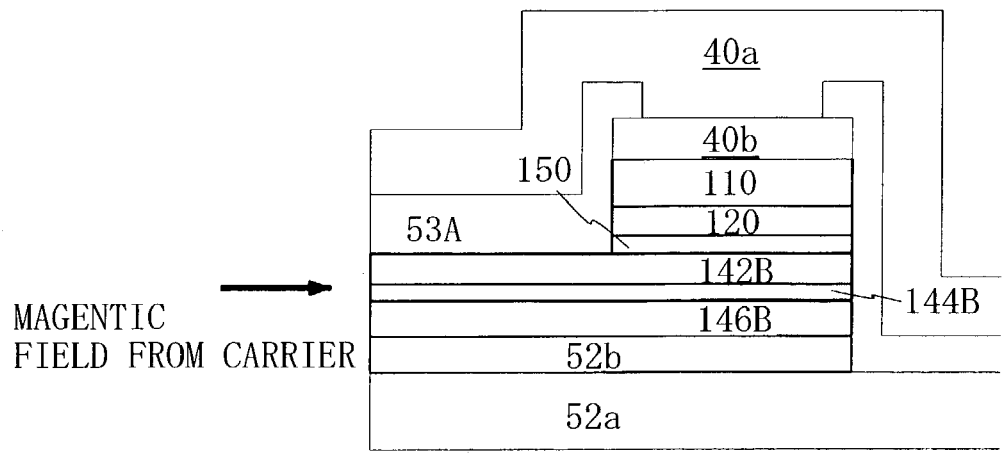
FIG. 10 is a sectional view of a flux guide type TMR head device having a structure shown in FIG. 7.

FIG. 10 shows the flux guide type head manufactured in accordance with this method. The lower electrode layer 52b is formed with a thickness of 200 Å on the lower shield 52a made of NiFe with a thickness of 3 µm. The TMR device 100B is formed in accordance with the above method, but the upper electrode layer 40b made of Cu is formed with a thickness of 200 Å on the antiferromagnetic layer before the resist to be etched is formed, and then the flux guide film 200B is formed through etching. Then, the process entirely forms the $Al_2O_3$ layer as the insulating gap layer 53A with a thickness of 200 Å, then removes the gap layer corresponding to part connected to the upper electrode layer 40b through etching, and entirely forms the NiFe film as the upper shield layer 40a with a thickness of 3 µm.

In the above inventive examples, a typical composition (a ratio of atomic volume) in each alloy layer is 81Ni-19Fe, 89Co-9Fe-2B, and 30Pd-18Pt-52Mn.

Magentoresistance curves as device characteristics were measured within a magnetic-field application range of ±500 Oe (oersted) using a four-terminal method. The measurement result is evaluated using device resistance R, device resistance change ΔR, and device sectional area A. The head in each example demonstrated high sensitivity.

Turning back to FIG. 1, the actuator 21 includes a voice coil motor (not shown in FIG. 1), a support shaft 15, and a carriage 16.

The voice coil motor may use any technology known in the art, and a detailed description thereof will be omitted herein. For example, the voice coil motor includes a permanent magnet fixed onto an iron plate fixed in the housing 12, and a mobile magnet fixed onto the carriage 16. The support shaft 15 is inserted into a cylindrical hollow hole in the carriage 16, and arranged such that it extends perpendicular to the paper surface in FIG. 1 in the housing 12. The carriage 16 includes a rigid arm 17 rotatably or swingably around the support shaft 15, and a suspension 18 that is attached to a tip of the arm 17 and extends forward from the arm 17. The suspension 18 is, for example, a Watlas type suspension made of stainless, which uses a gimbal spring (not shown) to cantilever the slider 19. The suspension 18 supports a wiring part connected to the slider 19 through a lead, etc. Since the wiring part is so small that it is omitted in FIG. 1. The sense current, read-in data, read-out data are supplied and output between the head 23 and the wiring part through such a lead. The suspension 18 applies an elastic force to the slider 19 against a surface of the magnetic disc 13.

Figure 11:
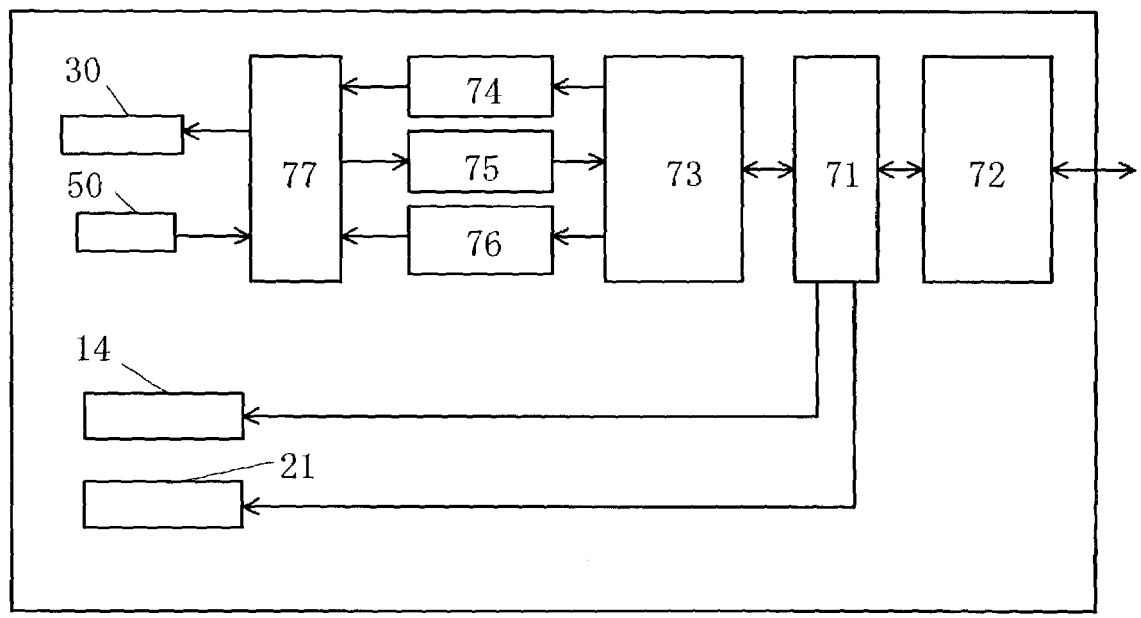
FIG. 11 is a block diagram for explaining a control system in the hard disc drive shown in FIG. 2.

FIG. 11 shows a control block diagram of a control system 70 in the HDD 11. The control system 70, which may be implemented as a control board, etc. in the HDD 11, includes a control part 71, an interface 72, a hard disc controller (referred to as "HDC" hereinafter) 73, a write modulation part 74, a read demodulation part 75, a sense-current control part 76, and a head IC 77. Of course, they are not necessarily arranged as one member; for example, only the head IC 77 is connected to the carriage 16.

The control part 71 covers any processor such as a CPU and MPU irrespective of its name, and controls each part in the control system 70. The interface 72 connects the HDD 11 to an external apparatus, such as a personal computer ("PC" hereinafter) as a host. The HDC 73 sends to the control part 71 data that has been demodulated by the read demodulation part 75, sends data to the write modulation part 74, and sends to the sense-current control part 76 a current value as set by the control part 71. Although FIG. 11 shows that the control part 71 provides servo control over the spindle motor 14 and (a motor in) the actuator 21, the HDC 73 may serve as such servo control. The write modulation part 74 modulates data and supplies data to the head IC 72, which data has been supplied from the host through the interface 72 and is to be written down onto the disc 13 by the inductive head 30. The read demodulation part 75 demodulates data into an original signal by sampling data read from the disc 13 by the MR head device 50. The write modulation part 74 and read demodulation part 75 may be recognized as one signal processing part. The head IC 77 serves as a preamplifier. Each part may apply any structure known in the art, and a detailed description thereof will be omitted.

In operation of the HDD 11, the control part 71 drives the spindle motor 14 and rotates the disc 13. The airflow associated with the rotation of the disc 13 is introduced between the disc 13 and slider 19, forming minute air film and thus generating the buoyancy that enables the slider 19 to float over the disc surface. The balance between the buoyancy and the elastic force spaces the slider 19 from the disc 13 by a constant distance.

The control part 71 then controls the actuator 21 and rotates the carriage 16 around the support shaft 15 for head 23's seek for a target track on the disc 13. The instant embodiment thus uses a swing arm type in which the slider 19 draws an arc locus around the support shaft 15, but the present invention is applicable to a linear type in which the slider 19 is a linear locus.

In the write time, the control part 71 receives data from the host such as a PC through the interface 72, selects the inductive head device 30, and sends data to the write modulation part 74 through the HDC 73. In response, the write modulation part 74 modulates the data, and sends the modulated data to the head IC 77. The head IC 77 amplifies the modulated data, and then supplies the data as write current to the inductive head device 30. Thereby, the inductive head device 30 writes down the data onto the target track.

In the read time, the control part 71 selects the MR head device 50, and sends the predetermined sense current to the sense-current control part 76 through the HDC 73. In response, the sense-current control part 76 supplies the sense current to the MR head device 50 through the head IC 77.

When the MR head device 50 is the CPP-GMR, it may flow higher sense current than the CIP-GMR, enhancing the sensitivity of the MR head device 50. When the MR head device 50 uses the spin-valve film 100, irrespective of the CIP and CPP configurations, facilitating control over magnetic domain and reduction of hysteresis, in comparison with a multilayer GMR film. When the MR head device 50 is the TMR, it has higher rate of change of magnetic resistance than the CIP-GMR, enhancing the sensitivity of the MR head device 50.

The flux guide 200 increases the rate of change of magnetic resistance in comparison with the spin-valve film 100 or TMR with no flux guide, enhancing the sensitivity and implementing the highly sensitive head having a larger device width WE than the core width of the flux guide film. Here, since the flux guide 200 is made of the synthetic ferri structure, the entire magnetization may be made small. Such a film having small magnetization may sensitively respond to a small external magnetic field. Therefore, the flux guide 200 contributes to enhancement of the head sensitivity, and the MR head device 50 that has been miniaturized to correspond to the bit size shrunk with the high surface recording density on the disc 13 exhibits high reading performance. Furthermore, the flux guide film 200 of this embodiment is less affected by the GMR and TMR than the conventional flux guide, e.g., less subject to deformation of the free layer.

Data is amplified by the head IC 77 based on the electric resistance of the MR head device 50 varying according to a signal magnetic field, and then supplied to the read demodulation part 75 to be demodulated to an original signal. The demodulated signal is sent to the host (not shown) through the HDC 73, controller 71, and interface 72.

Further, the present invention is not limited to these preferred embodiments, and various modifications and variations may be made without departing from the spirit and scope of the present invention. For example, the present invention is applicable to other magnetic apparatuses including a magnetic sensor (such as a magnetic potentiometer for detecting a displacement and an angle, a readout of a magnetic card, a recognition of paper money printed in magnetic ink, etc.), a magnetic switch, and an encoder as well as a magnetic head.

Thus, the inventive flux guide film having the synthetic ferri structure may provide a relatively easily processable and highly sensitive flux guide type magnetoresistive device.

What is claimed is:

1. A flux guide type device comprising:
a magnetoresistive device for reading a signal flux; and
a flux guide for transmitting the signal flux to said magnetoresistive device,
wherein said flux guide includes a laminated film that includes a ferromagnetic layer, a non-magnetic layer and a ferromagnetic layer in this order, and the two ferromagnetic layers in said flux guide have antiparallel directions of magnetization with respect to the non-magnetic layer,
wherein at least one of the ferromagnetic layers in said flux guide is selected from among $Co_{90}Fe$, $(Co_{90}Fe)_{98}B_2$ and $Ni_{80}Fe$.

2. A flux guide type device according to claim 1, wherein the two ferromagnetic layers in said flux guide are both made of $Co_{90}Fe$, and a difference in thickness in a layer direction between the ferromagnetic layers is 1 nm or less.

3. A flux guide type device according to claim 1, wherein the two ferromagnetic layers in said flux guide are both made of $(Co_{90}Fe)_{98}B_2$, and a difference in thickness in a layer direction between the ferromagnetic layers is 1 nm or less.

4. A flux guide type device according to claim 1, wherein the two ferromagnetic layers in said flux guide are both made of $Ni_{80}Fe$, and a difference in thickness in a layer direction between the ferromagnetic layers is 1.5 nm or less.

5. A flux guide type device comprising:
a magnetoresistive device for reading a signal flux; and
a flux guide for transmitting the signal flux to said magnetoresistive device,
wherein said flux guide includes a laminated film that includes a ferromagnetic layer, a non-magnetic layer and a ferromagnetic layer in this order, and the two ferromagnetic layers in said flux guide have antiparallel directions of magnetization with respect to the non-magnetic layer,
wherein the two ferromagnetic layers in said flux guide have different thicknesses in a layer direction, a thinner one of the ferromagnetic layers having a thickness of about 1.5 nm to 3 nm, and a thicker one of the ferromagnetic layers having a thickness of that of the thinner one plus about 0.5 nm to 1 nm.

6. A flux guide type device comprising:
a magnetoresistive device for reading a signal flux; and
a flux guide for transmitting the signal flux to said magnetoresistive device,
wherein said flux guide includes a laminated film that includes a ferromagnetic layer, a non-magnetic layer and a ferromagnetic layer in this order, and the two ferromagnetic layers in said flux guide have antiparallel directions of magnetization with respect to the non-magnetic layer,
wherein said magnetoresistive device is a layered member that includes:
a first ferromagnetic layer with a substantially fixed direction of magnetization; and
a second ferromagnetic layer with a freely variable direction of magnetization to an external magnetic field,
wherein the magnetization of the second ferromagnetic layer is smaller than that of said flux guide.

7. A flux guide type device according to claim 6, wherein the second magnetic layer has magnetization of about zero.

8. A flux guide type device comprising:
a magnetoresistive device for reading a signal flux; and
a flux guide for transmitting the signal flux to said magnetoresistive device,
wherein said flux guide includes a laminated film that includes a ferromagnetic layer, a non-magnetic layer and a ferromagnetic layer in this order, and the two ferromagnetic layers in said flux guide have antiparallel directions of magnetization with respect to the non-magnetic layer,
wherein said magnetoresistive device is a layered member that includes:
a first ferromagnetic layer with a substantially fixed direction of magnetization; and
a second ferromagnetic layer with a freely variable direction of magnetization to an external magnetic field,
wherein the second ferromagnetic layer includes a ferromagnetic layer, a non-magnetic layer and a ferromagnetic layer in this order, and the two ferromagnetic layers in the second ferromagnetic layer have antiparallel directions of magnetization with respect to the non-magnetic layer in the second ferromagnetic layer,
wherein at least one of the two ferromagnetic layers in the second ferromagnetic layer is selected from among $Co_{90}Fe$, $(Co_{90}Fe)_{98}B_2$ and $Ni_{80}Fe$.

9. A flux guide type device according to claim 8, wherein the two ferromagnetic layers in the second ferromagnetic layer are both made of $Co_{90}Fe$, and a difference in thickness in a layer direction between the ferromagnetic layers is 1 nm or less.

10. A flux guide type device according to claim 8, wherein the two ferromagnetic layers in said flux guide are both made of $(Co_{90}Fe)_{98}B_2$, and a difference in thickness in a layer direction between the ferromagnetic layers is 1 nm or less.

11. A flux guide type device according to claim 8, wherein the two ferromagnetic layers in said flux guide are both made of $Ni_{80}Fe$, and a difference in thickness in a layer direction between the ferromagnetic layers is 1.5 nm or less.

12. A flux guide type device comprising:
a magnetoresistive device for reading a signal flux; and
a flux guide for transmitting the signal flux to said magnetoresistive device,
wherein said flux guide includes a laminated film that includes a ferromagnetic layer, a non-magnetic layer and a ferromagnetic layer in this order, and the two ferromagnetic layers in said flux guide have antiparallel directions of magnetization with respect to the non-magnetic layer,
wherein said magnetoresistive device is a layered member that includes:
a first ferromagnetic layer with a substantially fixed direction of magnetization; and
a second ferromagnetic layer with a freely variable direction of magnetization to an external magnetic field,
wherein the second ferromagnetic layer includes a ferromagnetic layer, a non-magnetic layer and a ferromagnetic layer in this order, and the two ferromagnetic layers in the second ferromagnetic layer have antiparallel directions of magnetization with respect to the non-magnetic layer in the second ferromagnetic layer,
wherein the two ferromagnetic layers in the second ferromagnetic layer have different thicknesses in a layer direction, a thinner one of the ferromagnetic layers having a layer thickness of about 1.5 nm to 3 nm, and a thicker one of the ferromagnetic layers having a layer thickness of that of the thinner one plus about 0.5 nm to 1 nm.

13. A flux guide type device comprising:
a magnetoresistive device for reading a signal flux; and
a flux guide for transmitting the signal flux to said magnetoresistive device,
wherein said flux guide includes a laminated film that includes a ferromagnetic layer, a non-magnetic layer and a ferromagnetic layer in this order, and the two ferromagnetic layers in said flux guide have antiparallel directions of magnetization with respect to the non-magnetic layer,
wherein said magnetoresistive device is a layered member that includes:
a first ferromagnetic layer with a substantially fixed direction of magnetization; and
a second ferromagnetic layer with a freely variable direction of magnetization to an external magnetic field,
wherein the second ferromagnetic layer includes a ferromagnetic layer, a non-magnetic layer and a ferromagnetic layer in this order, and the two ferromagnetic layers in the second ferromagnetic layer have antiparallel directions of magnetization with respect to the non-magnetic layer in the second ferromagnetic layer,
wherein the two ferromagnetic layers in each of said flux guide and the second ferromagnetic layer have different thicknesses in a layer direction, and a difference in layer thickness between the two ferromagnetic layers in said flux guide is greater than that between the two ferromagnetic layers in the second ferromagnetic layer.

14. A read head comprising:
a flux guide type device that includes a magnetoresistive device for reading a signal flux, and a flux guide for transmitting the signal flux to the magnetoresistive device, wherein said flux guide includes a laminated film that includes a ferromagnetic layer, a non-magnetic layer and a ferromagnetic layer in this order, and the two ferromagnetic layers in said flux guide have antiparallel directions of magnetization with respect to the non-magnetic layer;
a part for supplying sense current to the magnetoresistive device; and
a part for reading a signal based on a change in electric resistance of the magnetoresistive device that changes in accordance with the signal flux,
wherein the two ferromagnetic layers in said flux guide have different thicknesses in a layer direction, a thinner one of the ferromagnetic layers having a thickness of about 1.5 nm to 3 nm, and a thicker one of the ferromagnetic layers having a thickness of that of the thinner one plus about 0.5 nm to 1 nm.

15. A drive comprising:
a head part including a read head and a write head; and
a drive part for driving a magnetic record carrier recorded and reproduced by said head part,
wherein the read head includes:
a flux guide type device that includes a magnetoresistive device for reading a signal flux, and a flux guide for transmitting the signal flux to the magnetoresistive device, wherein said flux guide includes a laminated film that includes a ferromagnetic layer, a non-magnetic layer and a ferromagnetic layer in this order, and the two ferromagnetic layers in said flux guide have antiparallel directions of magnetization with respect to the non-magnetic layer,
a part for supplying sense current to the magnetoresistive device; and
a part for reading a signal based on a change in electric resistance of the magnetoresistive device that changes in accordance with the signal flux,
wherein the two ferromagnetic layers in said flux guide have different thicknesses in a layer direction, a thinner one of the ferromagnetic layers having a thickness of about 1.5 nm to 3 nm, and a thicker one of the ferromagnetic layers having a thickness of that of the thinner one plus about 0.5 nm to 1 nm.

16. A magnetic apparatus comprising a flux guide type device, said flux guide type device including:
a magnetoresistive device for reading a signal flux; and
a flux guide for transmitting the signal flux to the magnetoresistive device, wherein said flux guide includes a laminated film that includes a ferromagnetic layer, a non-magnetic layer and a ferromagnetic layer in this order, and the two ferromagnetic layers in said flux guide have antiparallel directions of magnetization with respect to the non-magnetic layer,
wherein the two ferromagnetic layers in said flux guide have different thicknesses in a layer direction, a thinner one of the ferromagnetic layers having a thickness of about 1.5 nm to 3 nm, and a thicker one of the ferromagnetic layers having a thickness of that of the thinner one plus about 0.5 nm to 1 nm.

* * * * *